(12) United States Patent
Marion et al.

(10) Patent No.: US 8,883,866 B2
(45) Date of Patent: Nov. 11, 2014

(54) PROCESS FOR PRODUCTION OF HYDROCARBONS WITH CATALYST CONDITIONING

(71) Applicant: IFP Energies nouvelles, Rueil-Malmaison Cedex (FR)

(72) Inventors: Marie-Claire Marion, Vernaison (FR); Fabrice Diehl, Lyons (FR); Francois Hugues, Vernaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 55 days.

(21) Appl. No.: 13/712,232

(22) Filed: Dec. 12, 2012

(65) Prior Publication Data

US 2013/0158139 A1 Jun. 20, 2013

(30) Foreign Application Priority Data

Dec. 14, 2011 (FR) ..................................... 11 03862

(51) Int. Cl.
| | | |
|---|---|---|
| *C07C 27/00* | (2006.01) | |
| *B01J 20/34* | (2006.01) | |
| *B01J 37/18* | (2006.01) | |
| *B01J 23/89* | (2006.01) | |
| *B01J 23/889* | (2006.01) | |
| *B01J 23/75* | (2006.01) | |
| *B01J 23/83* | (2006.01) | |
| *C10G 2/00* | (2006.01) | |
| B01J 21/12 | (2006.01) | |
| B01J 37/02 | (2006.01) | |

(52) U.S. Cl.
CPC ................. *C10G 2/332* (2013.01); *B01J 37/18* (2013.01); *B01J 23/8913* (2013.01); *B01J 23/8896* (2013.01); *B01J 23/75* (2013.01); B01J 21/12 (2013.01); *B01J 23/83* (2013.01); B01J 37/0201 (2013.01); *B01J 23/8892* (2013.01)
USPC ............... 518/715; 518/700; 502/20; 502/34; 502/53

(58) Field of Classification Search
CPC .......... C10G 2/332; C07C 27/06; C07C 1/04; B01J 21/08
USPC .......... 518/700, 715; 502/20, 34, 53
See application file for complete search history.

(56) References Cited

U.S. PATENT DOCUMENTS

| | | | |
|---|---|---|---|
| 4,585,798 A | 4/1986 | Beuther et al. | |
| 6,869,978 B2 | 3/2005 | Wright et al. | |
| 6,962,947 B2 | 11/2005 | Wright et al. | |
| 2002/0198096 A1 | 12/2002 | Wright et al. | |
| 2005/0124706 A1 | 6/2005 | Wright et al. | |
| 2009/0023822 A1 | 1/2009 | Tijm | |
| 2010/0152035 A1* | 6/2010 | Visagie et al. | ................. 502/325 |
| 2013/0296448 A1* | 11/2013 | Wright et al. | ................. 518/728 |

OTHER PUBLICATIONS

Li, Jinlin et al., "Fischer-Tropsch synthesis. Effect of CO pretreatment on a ruthenium promoted Co/TiO2," Oct. 31, 2000; vol. 70, pp. 127-130; J.C. Baltzer AG, Science Publishers; Cited in Search Report, dated Mar. 7, 2012, issued in corresponding FR 11/03.862.
Search Report and Written Opinion, dated Mar. 7, 2012, issued in corresponding FR 11/03.862.

* cited by examiner

*Primary Examiner* — Jafar Parsa

(74) *Attorney, Agent, or Firm* — Millen, White, Zelano & Branigan, P.C.

(57) ABSTRACT

A method for continuous production of hydrocarbons from synthesis gas in the presence of a cobalt-based catalyst which comprises a step of providing synthesis gas from a source (1) of synthesis gas in a Fischer-Tropsch synthesis reactor (4). The method also includes the following steps:

a) conditioning of the catalyst in reduced state in a conditioning reactor (2) by contact with a flow of reducing gas from a synthesis gas source supplying the synthesis reactor, the reducing conditioning gas comprising carbon monoxide (CO) or a mixture comprising hydrogen ($H_2$) and carbon monoxide (CO), the $H_2/CO$ molar ratio of which is between 0.1 and 0.9, at a temperature between 200 and 500° C., and a total pressure between 0.1 and 5 MPa and under a gas flow between 1 and 20 Nl/h/g of catalyst to be treated, b) supply of reduced catalyst conditioned in step a) to the synthesis reactor (4).

15 Claims, 1 Drawing Sheet

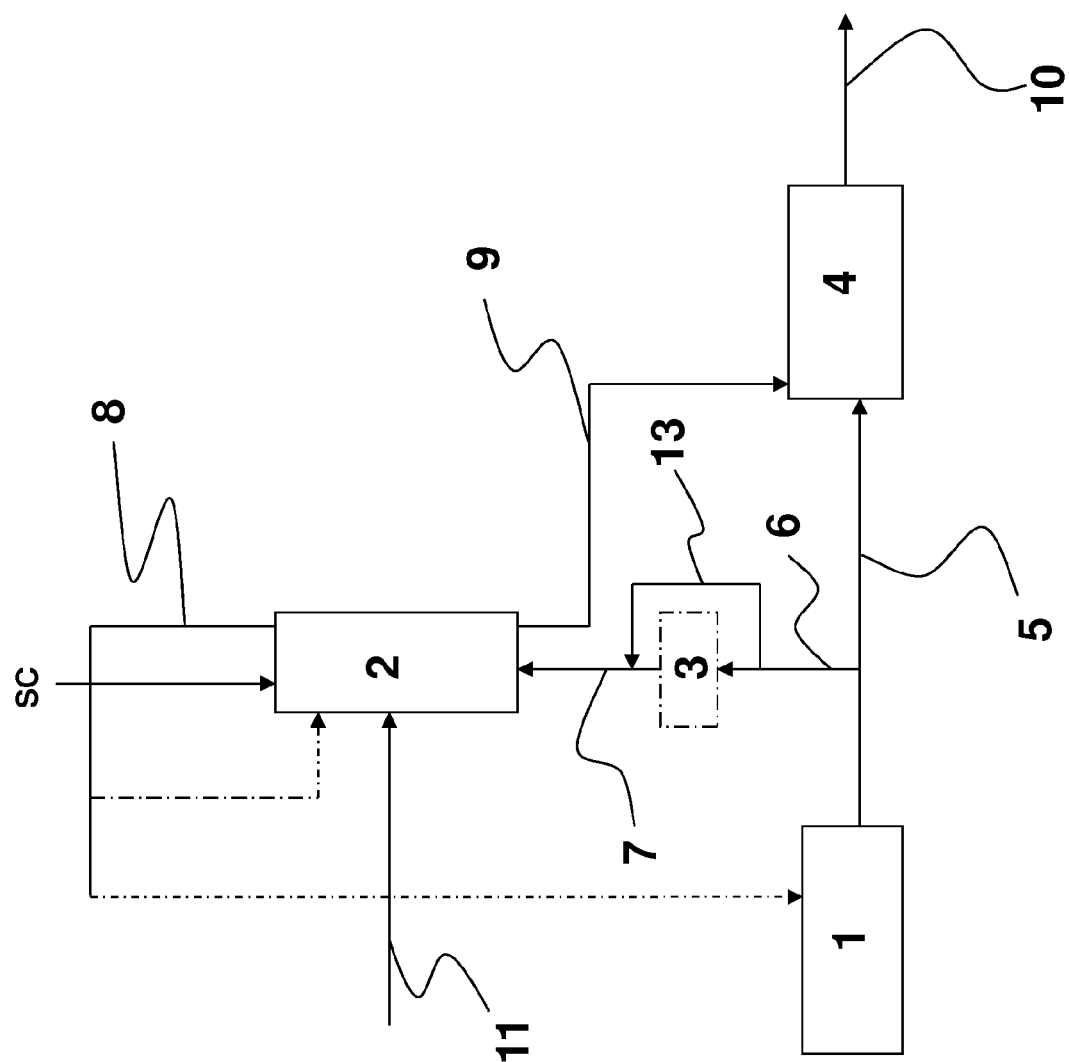

PROCESS FOR PRODUCTION OF HYDROCARBONS WITH CATALYST CONDITIONING

AREA OF THE INVENTION

The invention relates to a method for production of hydrocarbons. In particular the production process is a Fischer-Tropsch process for hydrocarbon synthesis from synthesis gas.

PRIOR ART

Hydrocarbon synthesis from a mixture comprising CO and $H_2$, more commonly called synthesis gas, has been known for a long time. Reference is made in particular to the work of F. Fischer and H. Tropsch who, in 1923, gave their names to this chemical transformation, well-known under the name Fischer-Tropsch synthesis. Fischer-Tropsch (FT) synthesis is a reaction which allows synthesising liquid paraffinic, olefinic hydrocarbons and/or oxygenated derivatives from synthesis gas which is itself obtained from natural gas, coal or biomass. Interest in this reaction, used industrially in Europe during the Second World War and also in South Africa since the 50s, has grown spectacularly since the 80s and 90s following the rise in the cost of oil and gas but also for environmental reasons. For example at present numerous GTL (gas to liquid) projects are seeing the light of day, for example in Qatar.

Fischer-Tropsch (FT) synthesis is also a way of processing natural gas and amongst others allows the production of very high quality diesel fuel without sulphur from natural gas.

Numerous metals can be used as a catalyst in this reaction, including cobalt (Co) and iron (Fe). The catalyst is generally prepared by impregnation of a support (for example a support based on alumina, silica or silica-alumina) from a metal precursor such as a nitrate or acetate of said metal. After one or a plurality of stages of drying and calcination, the catalyst is obtained "in oxide form", also known as an "oxide catalyst precursor", which comprises the metal oxide supported on the support.

Given that Fischer-Tropsch synthesis is catalysed by metal and not oxide, it is suitable to reduce the catalyst precursor in order to transform the metal oxide (for example $CoO_3O_4$) into a metal phase (Co(0)).

In general, the catalyst precursor is reduced in a dedicated unit under a gaseous atmosphere in the presence for example of hydrogen. After this reduction phase the catalyst is preferably protected from air in order to prevent its re-oxidation, and thus to conserve the active metal phase in its present state. One of the processes used industrially to protect the reduced catalyst during storage and transport until loading into the FT unit is a process of coating the reduced catalyst with paraffin. Under sufficient temperature conditions for the paraffin to be in liquid phase (generally between 50 and 200° C.), the reduced catalyst is mixed with this liquid. After cooling to ambient temperature, the catalyst is coated and protected in particular from air by the solidified paraffins.

It has also been noted that during FT synthesis, part of the catalyst and/or the active metal can be transferred into the formed hydrocarbon phase following phenomena of attrition or dissolution, and that the catalyst itself de-activates.

It is therefore necessary to add "fresh" catalyst regularly in order to maintain the productivity of the unit.

Document WO 2005/026292 is known which discloses a method for achieving the addition of catalyst. This method comprises the following steps:

transfer of the reduced FT catalyst coated with paraffin wax into a heated reactor in order to melt the wax material;

conditioning of the catalyst without its wax coating in a reactor supplied with gas comprising a mixture of $H_2$ and CO with $H_2$/CO molar ratio between 1 and 3;

supply of reduced and conditioned catalyst into the Fischer-Tropsch synthesis reactor.

Although functionally valid, the method according to the prior art can still be refined in terms of catalyst conditioning.

SUMMARY OF THE INVENTION

One aim of the invention is therefore to propose a continuous Fischer-Tropsch synthesis process incorporating a step of conditioning of the at least partly reduced catalyst so as to form a catalyst able to function immediately under the stationary conditions encountered within the Fischer-Tropsch reactor and with improved catalytic activity.

Thus according to the invention, the process of producing hydrocarbon continuously from synthesis gas in the presence of a cobalt-based catalyst comprises a synthesis step in which a synthesis gas is brought to react in the presence of a catalyst in a Fischer-Tropsch synthesis reactor, and is characterised in that the following steps are also performed:

a) conditioning of the catalyst in reduced state in a conditioning reactor by contact with a flow of reducing gas from a synthesis gas source supplying the synthesis reactor, the reducing conditioning gas comprising carbon monoxide (CO) or a mixture comprising hydrogen ($H_2$) and carbon monoxide (CO), the $H_2$/CO molar ratio of which is between 0.01 and 0.9, at a temperature between 200 and 500° C., and a total pressure between 0.1 and 5 MPa under a gas flow between 1 and 20 Nl/h/g of catalyst to be treated, b) supply of reduced catalyst conditioned in step a) to the synthesis reactor.

The applicant has observed surprisingly that conditioning under a reducing gas rich in CO allows formation of a catalyst with improved catalytic performance and which is operational more quickly under stationary FT synthesis conditions.

Without being bounded by any theory, the applicant correlates this observed effect with the presence of a crystalline phase of metallic cobalt (in particular compact hexagonal) different from the same catalyst reduced under $H_2$.

During preparation of the catalyst, first a catalyst precursor based on cobalt oxide is formed which is then subjected to a reduction stage which generally comprises placing the catalyst precursor in contact with a reducing gas at a high temperature (several hundred Celsius degrees). During this reduction stage, the cobalt present is reduced to zero oxidation state; however the yield of the reaction is a function of various parameters such as duration, temperature, gas flow, temperature, etc. Thus in the context of the invention, the term "cobalt-based catalyst in reduced state" means a catalyst comprising at least 20% by weight cobalt with zero oxidation state. The reduction rate can be determined by any method known to the person skilled in the art such as magnetism, potentiometry, X-ray diffraction, X-ray absorption spectroscopy.

In the context of the invention, the reduced catalyst used may be obtained by any method known to the person skilled in the art. For example this could be reduction under hydrogen as taught in documents EP 110 357, EP 261 870, EP 527 032, EP 927 146 (non-exhaustive list).

Preferably, the process according to the invention comprises an additional step a') of conditioning the catalyst conditioned in step a) under a reducing gas with $H_2/CO$ molar ratio between 1 and 3.

It has in fact been noted that this additional conditioning step advantageously allows the catalyst to reach a stationary catalytic activity more quickly.

According to another embodiment, the method according to the invention comprises another additional step a") of conditioning the catalyst conditioned in step a) under a reducing gas with $H_2/CO$ molar ratio greater than 3. This step a") may be followed by the step a') as defined above which finalises the catalyst conditioning. The purpose of step a") is to accelerate decarburisation of the catalyst fraction which would have been carburised during the step of conditioning under a gas rich in CO.

Steps a') and a") may also be operated in the same conditioning reactor as step a).

According to another embodiment of the method, steps a') and a") are operated in a conditioning reactor different from that of step a).

Preferably, the catalyst comprises a porous support comprising an oxide of one or a plurality of elements selected from Al, Si, Ti, Zr, Ce, Cu, Zn, Ni, Co. The catalyst can take the form of rods (extruded), balls or grains.

According to a preferred embodiment, the catalyst also comprises one or a plurality of metals selected from Cu, Mn, Ru, Pd, Pt, Re, La.

Advantageously, the conditioned catalyst is supplied to the synthesis reactor by pressurisation of the conditioning reactor by means of inert gas or conditioning gas.

BRIEF DESCRIPTION OF THE FIGURES

These aspects and other aspects of the invention are explained in the detailed description below of particular embodiments of the invention with reference to the drawing in FIG. 1.

FIG. 1 shows a principle diagram of the method according to the invention.

DETAILED DESCRIPTION OF PARTICULAR EMBODIMENTS

FIG. 1 shows a principle diagram of a unit for hydrocarbon production by Fischer-Tropsch type synthesis comprising:
- a source 1 of synthesis gas comprising as major constituents hydrogen ($H_2$) and carbon monoxide (CO);
- a conditioning reactor 2 supplied with a cobalt-based catalyst in reduced state from a catalyst source SC (not shown);
- a treatment unit 3 for the synthesis gas (this treatment unit 3 being optional);
- an FT synthesis reactor 4.

As shown in FIG. 1, the source 1 of synthesis gas supplies the synthesis reactor 4 via a supply pipe 5.

A pipe 6 allows part of the synthesis gas to be brought from the source 1 to the treatment unit 3. In the present example, the pipe 6 is connected to the supply pipe 5. However it is possible to link the pipe 6 to the source 1 of synthesis gas.

The synthesis gas treatment unit can for example be a membrane gas/gas separation device which allows enrichment of the synthesis gas with carbon monoxide CO. Thus at the outlet from the treatment unit 3, the reducing gas has a $H_2/CO$ molar ratio generally between 0.01 and 0.9, preferably between 0.05 and 0.7, and even more preferably between 0.1 and 0.5.

The pipe 13 serves as a branch pipe allowing direct supply of synthesis gas to the conditioning reactor 2 without modifying the composition thereof.

From the processing unit 3 branches off a pipe 7 which is intended to supply the conditioning reactor 2 with reducing gas, the composition of which has been modified compared to the source 1.

A pipe 11 furthermore allows the supply to the reactor 2 of a further gas flow (for example an inert gas) which is useful for the transitory phases (purge, pressurisation etc) or to dilute the gas flow supplied by pipe lines 7 or 13.

In the context of the invention, the reduced state catalyst comprises cobalt in metal form (i.e. with zero oxidation state) and a support based on silica, alumina, silica-alumina, zirconia, titanium oxide or any other support comprising one or a plurality of elements selected from Al, Si, Ti, Zr, Ce, Co, Cu, Zn, Ni.

The catalyst can also comprise one or a plurality of metals acting as promoter. For example the metal or metals can be selected from Cu, Mn, Ru, Pd, Pt, Re, La.

When the catalyst precursor is supported, it may be obtained by a process involving one or a plurality of steps of impregnation of the metal precursor(s) on the support (for example cobalt nitrate) followed by a step of drying and finally by a step of calcination as taught in document EP 527 032. This calcination step is intended in particular to decompose the metal precursor and form the metal oxide.

The reduced solid catalyst is brought into contact with the conditioning gas in the reactor 2 which may be of the fluidised bed type, the fixed bed type, an expanded bed or a counterflow reactor or a slurry-type reactor.

The operating conditions for conditioning are preferably as follows:
- temperature: between 200 and 500° C., preferably between 200° C. and 300° C.;
- total pressure: between 0.1 and 5 MPa, preferably between 1 and 4 MPa;
- gas flow rate in relation to mass quantity of catalytic solid treated: between 0.1 and 20 Nl/h/g, preferably between 1 and 10 Nl/h/g;
- duration: between 1 and 48 h, preferably between 2 and 24 h, preferably between 2 and 15 h.

As shown on FIG. 1, the effluent reducing gas is evacuated from the conditioning reactor 2 via a pipe 8 and may, where applicable, and after treatment be partly returned to the source 1 of synthesis gas or be partly recycled to the unit 3 or the reducing reactor 2.

The so-called "conditioned" catalyst is itself extracted from the conditioning reactor 2 and guided towards the FT synthesis reactor 4 via the pipe 9. The catalyst can be supplied by pressurised transfer, for example by pressurisation of the conditioning reactor such that the pressure inside the reactor 2 is greater than that in the synthesis reactor. This pressurisation may be obtained by the injection of inert gas or conditioning gas.

According to a preferred embodiment, the catalyst undergoes a second conditioning phase in the presence of a reducing gas with $H_2/CO$ molar ratio between 1 and 3; this molar ratio being close to that of the synthesis gas supplying the FT reactor.

According to another preferred embodiment, the catalyst conditioned in step a) under a gas rich in CO undergoes a conditioning phase in the presence of a reducing gas with $H_2/CO$ molar ratio greater than 3, before being brought into contact with a synthesis gas with an $H_2/CO$ molar ratio which is substantially the same as that used in the Fischer-Tropsch synthesis reactor.

Thus if the method according to the invention comprises more than one conditioning phase, the second phase and the following phases may be implemented either in the conditioning reactor 2 or in another reactor dedicated to this end.

The FT synthesis reaction is conducted in the reactor 4 under conventional operating conditions, namely:
- temperature: 200-250° C.
- total pressure: 10-40 bar
- $H_2/CO$: 1 to 3.

The hydrocarbons from the FT reaction are extracted from the synthesis reactor via the pipe 10. Some of the products formed in the reactor 4 are generally processed by hydrotreatment (hydrocracking and hydro-isomerisation) to produce, in particular, fuel.

The function of the method according to the invention will now be described below.

A) Start-Up Phase of the Unit

A useful quantity Q of reduced catalyst is fed into the conditioning reactor 2 for start-up of the FT synthesis in the reactor 4.

Then the step of conditioning the useful quantity Q of the catalyst is performed. To this end, a reducing gas is introduced into the reactor 2 which comprises either carbon monoxide (where applicable diluted with an inert gas) or a mixture of $H_2$ and CO via the pipes 6, 7. According to the invention, this conditioning reducing gas comes from the synthesis gas source supplying the FT reactor 4. The $H_2/CO$ molar ratio, which can vary between 0.01 and 0.9, preferably between 0.05 and 0.7 and more preferably between 0.1 and 0.5, is controlled by means of the treatment unit 3.

Then the reactor 2 is brought to the optimum conditions for conditioning the catalyst. This conditioning can be optimised by acting on various factors such as the temperature profile, the pressure profile, the flow of reducing gas and the conditioning duration.

Once the step of conditioning the catalyst is completed, the total useful quantity Q is then introduced into the reactor 4 and the FT synthesis reaction itself can begin while the pipe 9 supplying the reduced catalyst is closed.

B) Phase for Continuous Production of Hydrocarbon

In a Fischer-Tropsch process, a reduction in activity and productivity is observed either because of the loss of catalyst due to attrition (and transfer of catalyst fines) and a transfer into formed product, or by deactivation of the catalyst over time. Thus to maintain the productivity of the unit at its best level, it is essential to add fresh catalyst to compensate for this loss of material or activity.

To this end, after starting the synthesis, the conditioning reactor 2 is supplied with further reduced catalyst (new batch of reduced catalyst) and reducing gas in order to prepare a new batch of "fresh" conditioned catalyst which will then be used to supply the FT reactor 4 during the continuous operating time of said reactor 4.

Thus after this phase of conditioning, the catalyst can be sent into the synthesis reactor 4 which remains in operation. This addition (or "make-up") of catalyst is performed without interrupting the Fischer-Tropsch synthesis reaction.

Thanks to the process according to the invention, this addition is performed directly from the conditioning reactor either in continuous mode or in semi-continuous (batch) mode without requiring a stoppage, even temporary, of the synthesis unit. Also the conditioning conditions are optimised to form a reduced catalyst with catalytic activity which is already adapted to function under the operating conditions encountered in the FT synthesis reactor; the catalyst is therefore "ready for use".

Another advantage of the method according to the invention is that it is easy to control. Management of raw materials is relatively more flexible insofar as the conditioning gas comes from a single source of synthesis gas which may where applicable be treated before supply to the conditioning reactor.

To summarise, the method according to the invention offers the following advantages:
- lower cost in terms of material flow management as the catalyst is conditioned on the site of the synthesis unit from a gas taken from the gas source used for FT synthesis which is permanently available;
- provision of an active catalyst conditioned in the optimum manner with improved catalytic performance which is "ready for use" for synthesis, so as to reduce to as far as possible (even eliminate) the time necessary for the catalyst to be created so as to be available in an active form suitable for the stationary conditions found in the FT synthesis reactor;
- provision of an FT reactor for which the addition of "fresh" catalyst does not require interruption of the Fischer-Tropsch synthesis reaction or stoppage of the unit, and is performed while preserving the catalytic performance of the catalyst.

All these advantages lead to an improvement in productivity of the method in relation to the prior art.

EXAMPLES

Example 1

Comparative

A cobalt-based catalyst supported on a Siralox® support (alumina stabilised with Si, sold by Sasol), with a cobalt content of 13% expressed in weight in relation to the catalyst weight, is first reduced in the presence of hydrogen ($H_2$) at 400° C. for 4 h. This is the previously reduced reference catalyst.

30 g of this catalyst are fed into a Fischer-Tropsch (FT) slurry-type synthesis reactor previously charged with a paraffinic solvent (octadecane) and brought to 120° C. After loading the catalyst, synthesis gas with $H_2/CO$ ratio equal to 2.0 is introduced into the FT synthesis reactor. The pressure is raised to 20 bar and the temperature is brought to 230° C. at a rate of 50° C./h up to 200° C. then 10° C./h between 200 and 230° C. The FT synthesis reaction is then conducted continuously under the following conditions: 20 bar, 230° C., supply of synthesis gas 100 Nl/h and characterised by an $H_2/CO$ ratio of 2.0 (or composed of ⅓ CO and ⅔ $H_2$). The catalytic performance is measured over time.

Example 2

According to the Invention

The previously reduced catalyst (according to example 1) is loaded into the conditioning reactor and subjected to two successive treatments under CO and under synthesis gas, with the conditions specified in Table 1 below:

TABLE 1

| Treatment | No. 1 | No. 2 |
| --- | --- | --- |
| Reducing gas | CO (mixture CO/$N_2$) | $H_2$ + CO |
| T (° C.) | 200° C. | 230° C. |

TABLE 1-continued

| Treatment | No. 1 | No. 2 |
|---|---|---|
| P (bar) | 30 bar | 20 bar |
| GHSV (Nl/h/g) | 2 | 5 |
| Purity of reducing gas (% vol) | 10 (10/90) | 100% |
| Ratio $H_2/CO$ | — | 2 |
| Duration | 24 h | 2 h |

After these conditioning treatments, 30 g of the conditioned catalyst are transferred to the FT synthesis reactor and treated in the same way as in example 1. The catalytic performance is measured over time under 20 bar, 230° C., 100 Nl/h synthesis gas with $H_2/CO$ molar ratio of 2.

Example 3

According to the Invention

The previously reduced catalyst (according to example 1) is loaded into the conditioning reactor and subjected to three successive treatments under CO and under synthesis gas, with the conditions specified in Table 2 below:

TABLE 2

| Treatment | No. 1 | No. 2 | No. 3 |
|---|---|---|---|
| Reducing gas | CO (mixture $CO/N_2$) | $H_2$ + CO | $H_2$ + CO |
| T (° C.) | 200° C. | 230° C. | 230° C. |
| P (bar) | 30 bar | 20 bar | 20 bar |
| GHSV (Nl/h/g) | 2 | 5 | 5 |
| Purity of reducing gas (% vol) | 10 (10/90) | 100 | 100 |
| Ratio $H_2/CO$ | — | 7 | 2 |
| Duration | 24 h | 2 h | 2 h |

After these conditioning treatments, 30 g of the conditioned catalyst are transferred to the FT synthesis reactor and treated in the same way as in example 1. The catalytic performances are measured over time under 20 bar, 230° C., 100 Nl/h synthesis gas with $H_2/CO$ ratio of 2.

TABLE 3

The catalyst performances obtained in the three tests are given in table 3.

| Example | | 1 (comparative) | 2 (according to the invention) | 3 (according to the invention) |
|---|---|---|---|---|
| Performance at t | t (h) | | | |
| CO conversion | 2 h | 10 | 15 | 50 |
| (%) | 24 h | 33 | 50 | 51 |
| | 48 h | 42 | 51 | 51 |
| CH4 selectivity (% mol C) | 48 h | 11 | 9.5 | 9.5 |
| C5 + selectivity (% mol C) | 48 h | 80 | 82 | 82 |

Comparison of the results of the catalytic tests on the catalysts presented in Table 3 clearly illustrate the gain in terms of catalyst performance of the catalysts conditioned according to the invention:

the CO conversion rate at 48 h rises from 42% for the comparative example to 51% for the catalysts conditioned according to examples 2 or 3.

we also note a reduction in CH4 selectivity, accompanied by an increase in C5+ selectivity.

Also, comparison of the performances obtained as a function of time in examples 2 and 3 according to the invention illustrates the additional benefit of the conditioning method described in example 3. Two hours after starting the synthesis, the catalyst conditioned in this way is "operational", as shown in particular by a high conversion rate (50%).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 11/03.862, filed Dec. 14, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Method for continuous production of hydrocarbon from synthesis gas in the presence of a cobalt-based catalyst, comprising a step of synthesis in which a synthesis gas is brought to reaction in the presence of the cobalt-based catalyst in a Fischer-Tropsch (4) synthesis reactor, wherein the following steps are also performed:
   a) conditioning of the catalyst in reduced state in a conditioning reactor (2) by contact with a flow of reducing gas from a synthesis gas source supplying the synthesis reactor, the reducing conditioning gas comprising carbon monoxide (CO) or a mixture comprising hydrogen ($H_2$) and carbon monoxide (CO), the $H_2/CO$ molar ratio of which is between 0.01 and 0.9, at a temperature between 200 and 500° C., and a total pressure between 0.1 and 5 MPa under a gas flow between 1 and 20 Nl/h/g of catalyst to be treated, for a duration between 1 and 48 h,
   b) supply of reduced catalyst conditioned in step a) to the synthesis reactor (4).

2. Method according to claim 1, comprising an additional step a') of conditioning the catalyst conditioned in step a) in the presence of a conditioning reducing gas with $H_2/CO$ molar ratio between 1 and 3.

3. Method according to claim 2, comprising an additional intermediate step a'') of conditioning the catalyst in the presence of a reducing gas with $H_2/CO$ molar ratio greater than 3, step a'') being performed before step a').

4. Method according to claim 3, in which steps a') and a'') are performed in the same conditioning reactor as that in step a).

5. Method according to claim 3, in which steps a') and a'') are performed in a conditioning reactor different from that in steps a).

6. Method according to claim 1, comprising a previous step of treating the reducing gas from a synthesis gas source used for the conditioning.

7. Method according to claim 1, comprising a previous step of treating the reducing gas from a synthesis gas source used for the conditioning to purge said synthesis gas of $H_2$ and provide a gas consisting essentially of CO.

8. Method according to claim 1, in which the catalyst comprises a support comprising an oxide of one or a plurality of elements selected from Al, Si, Ti, Zr, Ce, Cu, Zn, Ni and Co.

9. Method according to claim 1, in which the catalyst also comprises one or a plurality of metals selected from Cu, Mn, Ru, Pd, Pt, Re and La.

10. Method according to claim 1, in which the conditioning reactor is a fluidised bed type reactor, a fixed bed, expanded bed or counterflow reactor or a slurry-type reactor.

11. Method according to claim 1, in which step b) is performed by pressurization of the conditioning reactor (2) such that the total pressure in the conditioning reactor (2) is greater than the total pressure in the synthesis reactor (4).

12. Method according to claim 1, wherein the cobalt-based catalyst comprises cobalt in metal form with zero oxidation state and a support.

13. Method according to claim 12, wherein the support is based on silica, alumina, silica-alumina, zirconia or titanium oxide.

14. Method according to claim 1, wherein the conditioning is conducted under the following operating conditions:
temperature: between 200° C. and 300° C.;
total pressure: between 1 and 4 MPa;
gas flow between 1 and 10 Nl/h/g;
duration: between 2 and 24 h.

15. Method according to claim 2, wherein the additional step a') of conditioning the catalyst conditioned in step a) in the presence of a conditioning reducing gas with $H_2/CO$ molar ratio between 1 and 3 is conducted after step a).

* * * * *